Patented Mar. 22, 1932

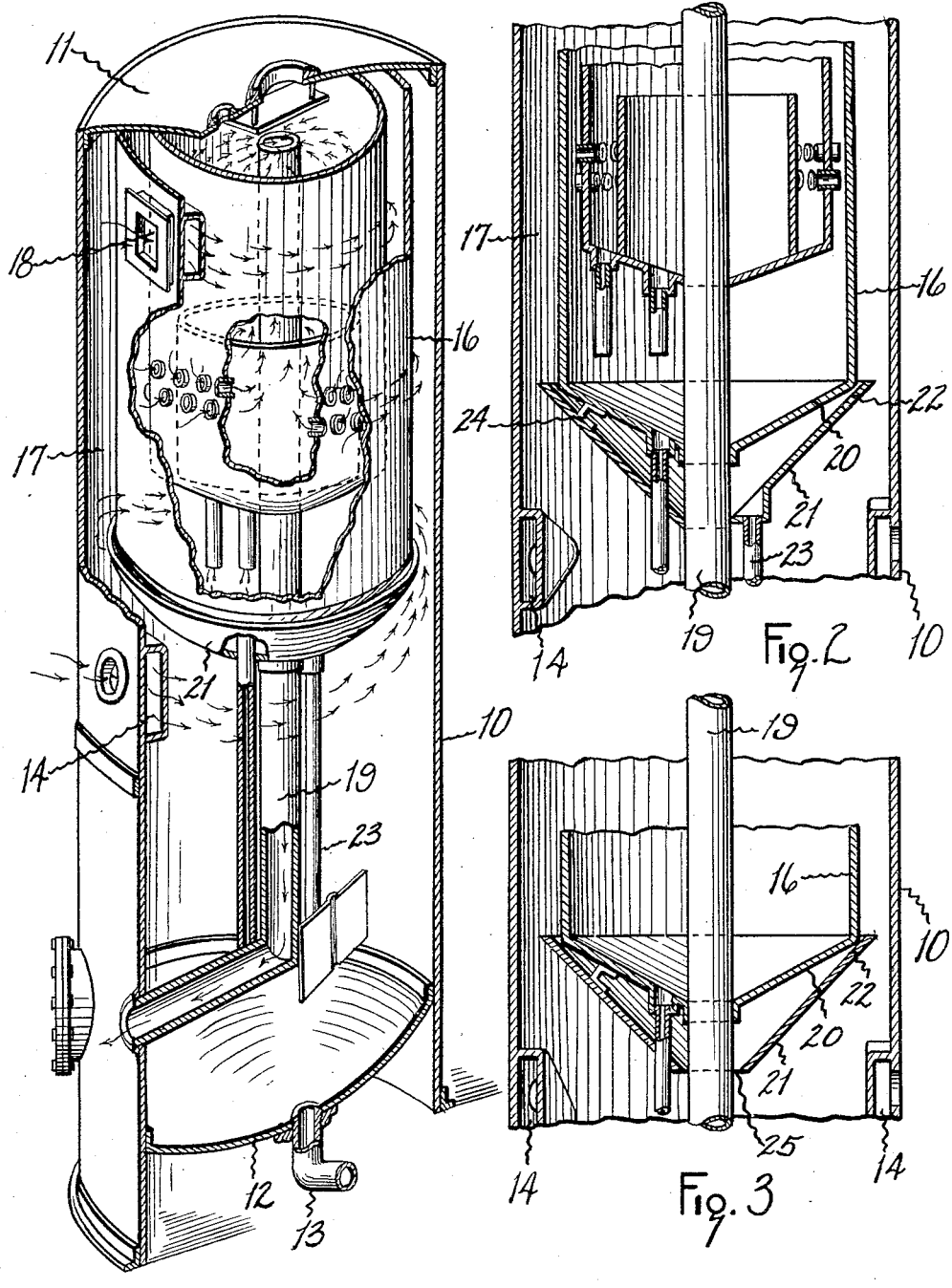

1,850,430

UNITED STATES PATENT OFFICE

JAY P. WALKER, OF TULSA, OKLAHOMA

DRIP BASIN FOR FLUID SEPARATORS

Application filed December 3, 1928. Serial No. 323,513.

This invention relates to new and useful improvements in drip basins for fluid separators.

One object of the invention is to provide a basin located above or opposite the influent entrance for deflecting the influent gases from dripping or falling liquids, thus preventing further impregnation of the gases with liquids.

A particular object of the invention is to provide a basin at the bottom of the inner shell of a separator for catching and collecting liquids dripping from or running down the outer surface of said shell and conducting such liquids to a common point of discharge, remote from the influent gases.

A further object of the invention is to provide a basin which will act as a deflector or guide for influencing whirling entrant gases to move outwardly and upwardly to the inner circumferential wall of the separator tank.

A construction designed to carry out the invention will be hereinafter described, together with other features of the invention.

The invention will be more readily understood from a reading of the following specification and by reference to the accompanying drawings, in which an example of the invention is shown, and wherein:

Fig. 1 is a view partly in elevation and partly in section showing a basin applied to a separator in accordance with the invention, Fig. 2 is a partial vertical sectional view, and Fig. 3 is a similar view showing a modified form.

In the drawings the numeral 10 designates an upright cylindrical tank having a crowned top 11 and dished bottom 12 elevated sufficiently for connection of a drain pipe 13 thereunder, all of which is subject to variation in design.

At the central portion of the tank I provide spaced nozzles 14, preferably of the flaring type, mounted on the inner wall of said tank. These nozzles are suitably connected with the external pipes (not shown) through which the gases and liquids to be separated are supplied. Various forms of nozzles could be used, but it is preferable to use a nozzle which tends to whirl the influent within the tank. Also a vertically flaring nozzle has the advantage of starting the heavier liquids downwardly and the gases upwardly.

A cylindrical shell 16 is concentrically mounted within the tank, having its upper end suitably fastened to the top 11. The shell is spaced sufficiently from the inner wall of the tank to provide an annular channel 17 into which the gases and lighter oil vapors rise and circulate. At its upper end the shell has inlet openings 18 located in its side wall. Within the shell are other separating elements forming no part of this particular invention. A gas escape 19 leads from within the shell downwardly to the lower portion of the tank.

Considerable liquid will be scrubbed out of the upwardly circulating gases and vapors in the channel which are seeking an outlet through the openings 18. Such liquids as adhere to the outer surface of the shell 16 will run down the same and either drip or fall from its lower edge or pass down its inclined bottom 20, thus being discharged almost directly into the path of the rising gases and vapors.

As the object is to separate the liquids from the gas the further saturation by the dripping liquids is a backward step. In carrying out the invention an inverted conical basin 21 has its upper end surrounding the bottom of the shell, while the lower end of the basin fits snugly around the gas pipe 19.

The annular lip 22 of the basin extends beyond the lower edge of the shell, so that liquids running down the outer surface of the shell and dripping from the said edge are caught in the basin. The liquids caught in the basin are conducted therefrom by a drain pipe 23 to the bottom of the tank. The basin may be attached to the shell bottom 20 by a bracket 24, or supported in any other suitable manner.

In Fig. 3 the drain pipe 23 is omitted and an annular opening 25 is left at the bottom of the basin surrounding the pipe 19. This will permit the liquids caught in the basin to run down the outside of the pipe 19 to the bottom of the tank. The basin is given a rather steep pitch so as to readily drain the liquids.

It will be noted that the basin 21 is located just above the nozzles 14. The influent gases and vapors whirl around the interior of the tank and such as come into contact with the outer wall of the basin are deflected outwardly and upwardly into the channel 17.

Liquids dripping from the shell are caught by the basin instead of falling through the influent gases and vapors. The vapors and gases contacting with the outer surface of the basin will undergo a certain amount of scrubbing and will be thus robbed of their liquid content. The liquids collecting on the outer surface of the basin will quickly run down the same and follow the pipe 19 to the bottom of the tank.

Various changes in the size and shape of the different parts, as well as modifications and alterations, may be made within the scope of the appended claims.

What I claim, is:

1. In a fluid separator, the combination with an upright tank having inlets in its sides for influent fluids, and a shell within the tank in the path of the influent, of a basin underlying and separate from the shell having a free annular lip for catching the liquids dripping and falling from the outer surface of said shell.

2. The combination with a separator tank having influent nozzles in its sides and an inner cylindrical shell above said nozzles in the path of the influent, of an inverted conical basin above said nozzles and surrounding the bottom of said shell, whereby the influent gases and vapors are deflected upwardly and outwardly toward the wall of the tank and also whereby liquids dripping from the outer surface of said shell are caught and deflected from the path of the influent.

3. In a fluid separator, an upright tank having spaced nozzles at its mid-height area, a cylindrical shell within the tank above the nozzles and spaced from the tank to form an annular vertical channel, a gas escape pipe extending from the shell to the bottom of the tank, and an inverted conical basin having its lower end surrounding said pipe and its upper end extending laterally beyond the bottom edge of the shell for catching drippings therefrom, the basin having a steep pitch for causing liquids to drain quickly therefrom.

In testimony whereof I affix my signature.

JAY P. WALKER.